(12) United States Patent
Cranor et al.

(10) Patent No.: US 8,660,115 B2
(45) Date of Patent: *Feb. 25, 2014

(54) METHOD FOR CONTENT-AWARE REDIRECTION AND CONTENT RENAMING

(75) Inventors: Charles D. Cranor, Morristown, NJ (US); Raman Gopalakrishnan, San Jose, CA (US); Matthew D. Green, New York, NY (US); Charles Robert Kalmanek, Jr., Short Hills, NJ (US); David Hilton Shur, Holmdel, NJ (US); Sandeep Sibal, Scotch Plains, NJ (US); Jacobus E. van der Merwe, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,586

(22) Filed: Sep. 14, 2012

(65) Prior Publication Data

US 2013/0013747 A1    Jan. 10, 2013

Related U.S. Application Data

(63) Continuation of application No. 11/213,610, filed on Aug. 26, 2005, now Pat. No. 8,306,022, which is a continuation of application No. 09/683,334, filed on Dec. 14, 2001, now Pat. No. 6,954,456.

(51) Int. Cl.
| | |
|---|---|
| H04L 12/66 | (2006.01) |
| H04L 12/28 | (2006.01) |
| G06F 15/173 | (2006.01) |
| H04W 40/24 | (2009.01) |

(52) U.S. Cl.
USPC ........... 370/356; 370/328; 370/401; 370/402; 709/203; 709/220; 709/226; 709/240; 725/91; 455/445

(58) Field of Classification Search
USPC ............ 370/328–463; 709/203–240; 455/445
See application file for complete search history.

(56) References Cited

U.S. PATENT DOCUMENTS

| | | | | |
|---|---|---|---|---|
| 6,006,264 | A * | 12/1999 | Colby et al. | 709/226 |
| 6,151,624 | A * | 11/2000 | Teare et al. | 709/217 |
| 6,173,311 | B1 * | 1/2001 | Hassett et al. | 709/202 |
| 6,243,443 | B1 * | 6/2001 | Low et al. | 379/88.17 |
| 6,336,137 | B1 | 1/2002 | Lee et al. | |
| 6,374,402 | B1 | 4/2002 | Schmeidler et al. | |
| 6,415,323 | B1 | 7/2002 | McCanne et al. | |
| 6,487,407 | B2 | 11/2002 | Goldberg et al. | |
| 6,502,102 | B1 | 12/2002 | Haswell et al. | |
| 6,523,027 | B1 | 2/2003 | Underwood | |
| 6,549,773 | B1 | 4/2003 | Linden et al. | |
| 6,553,413 | B1 | 4/2003 | Lewin et al. | |
| 6,601,233 | B1 | 7/2003 | Underwood | |
| 6,609,128 | B1 | 8/2003 | Underwood | |
| 6,611,872 | B1 | 8/2003 | McCanne | |
| 6,614,781 | B1 | 9/2003 | Elliott et al. | |
| 6,633,878 | B1 | 10/2003 | Underwood | |
| 6,701,514 | B1 | 3/2004 | Haswell et al. | |
| 6,704,873 | B1 | 3/2004 | Underwood | |
| 6,718,535 | B1 | 4/2004 | Underwood | |

(Continued)

*Primary Examiner* — Ayaz Sheikh
*Assistant Examiner* — Venkatesh Haliyur

(57) ABSTRACT

The present invention is directed to mechanisms for content-aware redirection and content exchange/content discovery that permit a request for content to be redirected to a particular advantageous server that can serve the content.

9 Claims, 7 Drawing Sheets

(56) References Cited

U.S. PATENT DOCUMENTS

| | | |
|---|---|---|
| 6,738,813 B1 | 5/2004 | Reichman |
| 6,738,827 B1 | 5/2004 | Abir |
| 6,748,386 B1 | 6/2004 | Li |
| 6,772,211 B2 | 8/2004 | Lu et al. |
| 6,785,704 B1 | 8/2004 | McCanne |
| 6,799,214 B1 | 9/2004 | Li |
| 6,865,605 B1 | 3/2005 | Soderberg et al. |
| 6,873,849 B2 * | 3/2005 | de la Red et al. ............. 455/445 |
| 6,907,546 B1 | 6/2005 | Haswell et al. |
| 6,954,456 B2 * | 10/2005 | Cranor et al. ................. 370/356 |
| 6,968,389 B1 * | 11/2005 | Menditto et al. ............. 709/233 |
| 6,976,090 B2 | 12/2005 | Ben-Shaul et al. |
| 6,996,599 B1 | 2/2006 | Anders et al. |
| 7,013,289 B2 | 3/2006 | Horn et al. |
| 7,017,162 B2 * | 3/2006 | Smith et al. .................. 719/328 |
| 7,020,685 B1 | 3/2006 | Chen et al. |
| 7,027,577 B2 | 4/2006 | Gourraud et al. |
| 7,100,195 B1 | 8/2006 | Underwood |
| 7,162,539 B2 | 1/2007 | Garcie-Luna-Aceves |
| 7,181,731 B2 | 2/2007 | Pace et al. |
| 7,216,170 B2 * | 5/2007 | Ludvig et al. ................. 709/225 |
| 7,240,100 B1 * | 7/2007 | Wein et al. .................... 709/214 |
| 7,418,509 B2 | 8/2008 | Koskelainen et al. |
| 7,496,092 B2 | 2/2009 | Wilson |
| 7,562,153 B2 * | 7/2009 | Biliris et al. .................. 709/238 |
| 7,627,887 B2 * | 12/2009 | Bisher et al. ..................... 725/91 |
| 7,653,700 B1 * | 1/2010 | Bahl et al. ..................... 709/217 |
| 7,706,740 B2 | 4/2010 | Collins et al. |
| 7,784,092 B2 * | 8/2010 | Pearson et al. ..................... 726/8 |
| 7,840,681 B2 | 11/2010 | Acharya et al. |
| 7,876,748 B1 | 1/2011 | Conner et al. |
| 7,917,583 B2 | 3/2011 | Angiolillo et al. |
| 7,921,226 B2 * | 4/2011 | Mukherjee et al. ........... 709/238 |
| 8,281,035 B2 * | 10/2012 | Farber et al. .................. 709/245 |
| 8,306,022 B1 * | 11/2012 | Cranor et al. ................. 370/356 |
| 8,327,406 B2 * | 12/2012 | Gentric et al. ................... 725/87 |
| 8,433,771 B1 * | 4/2013 | Ellsworth et al. ............. 709/213 |
| 2002/0078233 A1 * | 6/2002 | Biliris et al. .................. 709/238 |
| 2002/0194601 A1 | 12/2002 | Perkes et al. |
| 2003/0093462 A1 | 5/2003 | Koskelainen et al. |
| 2003/0093523 A1 * | 5/2003 | Cranor et al. ................. 709/225 |
| 2006/0020684 A1 * | 1/2006 | Mukherjee et al. ........... 709/219 |
| 2006/0156351 A1 * | 7/2006 | Gentric et al. ................... 725/86 |
| 2006/0165014 A1 * | 7/2006 | Ikeda ............................. 370/254 |
| 2006/0218625 A1 * | 9/2006 | Pearson et al. ..................... 726/4 |
| 2006/0265427 A1 * | 11/2006 | Cohen et al. .................. 707/200 |
| 2009/0055267 A1 * | 2/2009 | Roker ............................. 705/14 |
| 2009/0193466 A1 * | 7/2009 | Ehreth et al. ..................... 725/47 |
| 2011/0029596 A1 * | 2/2011 | Spatscheck et al. ........... 709/203 |
| 2012/0240178 A1 * | 9/2012 | Meuninck ..................... 725/116 |
| 2013/0114456 A1 * | 5/2013 | Dahod .......................... 370/252 |

* cited by examiner

METHOD FOR CONTENT-AWARE REDIRECTION AND CONTENT RENAMING

CROSS REFERENCE TO RELATED APPLICATION

This application is a continuation of U.S. patent application Ser. No. 11/213,610, filed Aug. 26, 2005, which is a continuation of U.S. patent application Ser. No. 09/683,334, filed Dec. 14, 2001, now U.S. Pat. No. 6,954,456, both of which are incorporated herein by reference in their entirety.

BACKGROUND OF INVENTION

The present invention relates to content distribution in packet-switched networks.

Packet-switched networks, such as networks based on the TCP/IP protocol suite, can be utilized to distribute a rich array of digital content to a variety of different client applications. The most popular applications on the Internet today are browsing applications for searching the World Wide Web, e.g. Netscape Navigator or Microsoft Internet Explorer, which utilize the HyperText Transfer Protocol (HTTP) to retrieve documents written in the HyperText Markup language (HTML) along with embedded content. See, e.g., R. Fielding et al., "Hypertext Transfer Protocol—HTTP/1.1," IETF Network Working Group, RFC 2616 (1999), which is incorporated by reference herein. Other protocols for delivering data such as streaming media across the Internet include the Real Time Streaming Protocol (RTSP). See, e.g., H. Schulzrinne et al., "Real Time Streaming Protocol (RTSP)," IETF Network Working Group, RFC 2326 (April 1998), which is incorporated by reference herein. Resources on the Internet, such as HTML documents or multimedia content, are identified by Uniform Resource Identifiers (URIs). See, e.g., T. Berners-Lee et al., "Uniform Resource Identifiers (URI): Generic Syntax," IETF Network Working Group, RFC 2396 (August 1998), which is incorporated by reference herein. URIs can be expressed by a representation of their location-dependent network access mechanism, i.e. as a Uniform Resource Locator (URL) (e.g. "http://www.xyz.com/dir/document.html"), or by a persistent name referred to as a Uniform Resource Name (URN).

It is often advantageous when distributing content across a packet-switched network to divide the duty of answering content requests among a plurality of geographically dispersed servers. Companies such as Akamai Technologies, Digital Island, AT&T and Adero provide services—referred to in the are as "content distribution" services—utilizing architectures which dynamically redirect content requests to a cache advantageously situated closer to the client issuing the request. Such network architectures are referred to herein generically as "content distribution networks" or "CDNs" for short. In its simplest form, content distribution networks consist of origin servers and edge servers. Clients connect to edge servers to request content. Requested content may already be in the edge server that the client connect to (for example if all of the edges are pre-populated with all of the content), or the edge server in question might fetch the content from the origin server on-demand if it does not already have the requested content. These two extremes, namely complete pre-population of the edges and on-demand loading of the edges, is clearly suboptimal in terms of storage and latency respectively. This is particularly true in the case of high quality streaming content where storing all of the content in all of the edge servers will not be feasible. At the same time if say a particular large piece of digital content, e.g. a movie, is already at an edge server, a new client requesting the same movie might potentially be best served from the same edge server.

SUMMARY OF INVENTION

The present invention is directed to mechanisms for content-aware redirection and content exchange/content discovery that permit a request for content to be redirected to a particular advantageous server that can serve the content. In accordance with an embodiment of the invention, the content-aware redirection mechanism roughly consists of a front-end and a back-end. The front-end makes use of the requested content to redirect a request to an edge server where the content might already be present or an edge that should request the content from the origin. The back-end takes part in a content exchange/content discovery process to determine where content is currently located. The requested content can advantageously be rewritten during the redirection process to not require the name of the requested and served object to be the same. Content renaming can be utilized for example to efficiently map different content names to the same piece of stored content.

These and other advantages of the invention will be apparent to those of ordinary skill in the art by reference to the following detailed description and the accompanying drawings.

DETAILED DESCRIPTION

Figure 1:
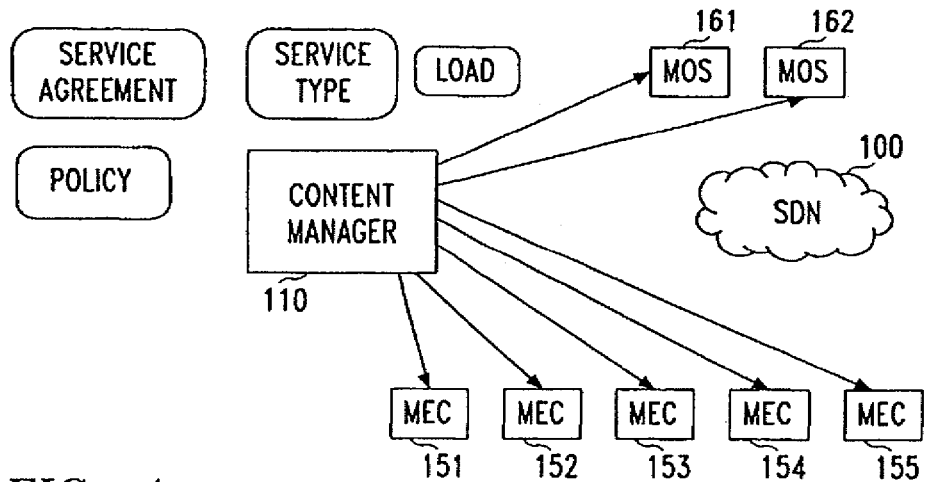
FIG. 1 is a conceptual representation of a content management architecture.

FIG. 1 is a conceptual representation of a content management architecture.

Content can be distributed to clients from either origin servers, e.g. 161, 162, or from clusters of edge servers, e.g. 151, 152, . . . 155. It is advantageous to have a content manager 110 which is able to selectively pre-populate some of the edge servers with content based on various factors, such as a negotiated service agreement, load, the particular service type, other policies, etc. In particular, for example, for high-quality streaming of media, it is desirable not to have all of the content populating all of the edge server clusters. In this type of environment it becomes crucial for a client to connect to an edge server that already has the content it is requesting. The present invention is directed to various mechanisms which facilitate effective content management.

Figure 2:
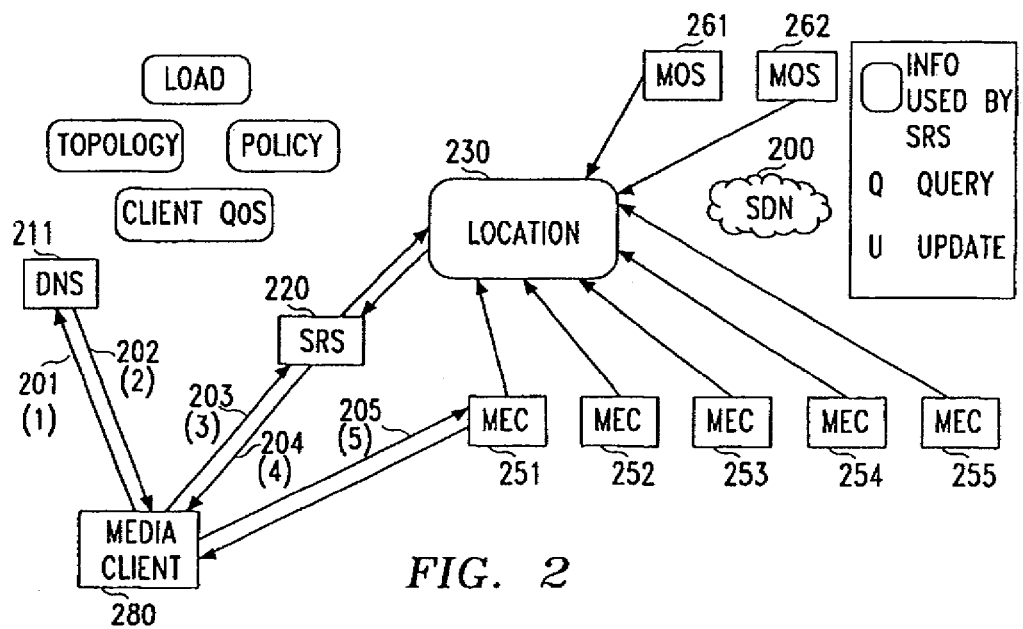
FIG. 2 is a conceptual representation of content redirection and content discovery in a network, in accordance with an embodiment of the present invention.

FIG. 2 is a conceptual representation of content redirection and content discovery in a network, in accordance with an embodiment of the present invention. The system, roughly speaking consists of two parts: a front end responsible for redirecting clients and a back end that determines where the client should be redirected. A network 200 distributes content from multiple edge and origin servers to clients, e.g. client 280. The present invention is not limited to a particular content distribution architecture, although an advantageous architecture for the distribution of streaming content is described in co-pending commonly-assigned U.S. patent application, "Network Based Replay Portal," Ser. No. 09/726,576, filed on Dec. 1, 2000, which is incorporated by reference herein. herein. At step 201, a media client 280 consults a local domain name system (DNS) server 211 with a URL for the particular content it seeks. The DNS server 211, at step 202, resolves the URL to a redirect server 220. The redirect server 220 queries a mapping service 230 responsible for determining where content is located in the system. The mapping service, as further described below, can comprise one or more mapping servers which receive updates from origin servers 261, . . . 262 and from edge servers 251, . . . 255. At step 204, the redirect server 220 redirects the client to an advantageous edge (or origin) server. At step 205, the client 280 requests the content from the media server.

Redirection Mechanisms

There are at least two places where the redirection can take place. For example, and without limitation, streaming media over an IP network typically involves first making a selection from an HTML web page. As a result of the selection, a helper file is downloaded and a media player application is started. The helper file contains a streaming URL (or URLs) which the player then uses to connect to the relevant media server by means of a streaming control protocol.

The first method of redirection involve dynamically generating the helper file with a URL (or URLs) containing the hostname (or IP address) of the edge server that the client should be connecting to.

The second method of redirection makes use of explicit redirection that is present in most streaming control protocols (including RTSP, HTTP and MMS (in version 7.0)). In this case the media client connects to a redirecting media server. This media server never serves up content but always redirects the client by means of the control protocol to the appropriate edge server.

Note the proposed solution also enables an additional benefit beyond finding the appropriate edge server: The requested content (object) is taken into account in making the redirection decision. The result of the redirection is a new URL which contains a new hostname (or more likely the IP address) of the selected edge server as well as the selected object. This allows the opportunity to also remap the requested object during the redirection process. The implication of this is that name of the object that a user selects and the name of the object it is actually served need not be the same. This property can be exploited in a number of ways. For example a CDN customer (i.e. a content provider) can use its own naming convention which gets mapped onto a naming convention within the CDN which is more efficient for the CDN provider. (E.g. a CDN provider might determine that the a piece of content provided by two different content providers are really the same piece of content (such as a movie for example) and therefore choose to exploit that within the CDN to have two different customer names map to the same piece of stored content.)

Figure 3:
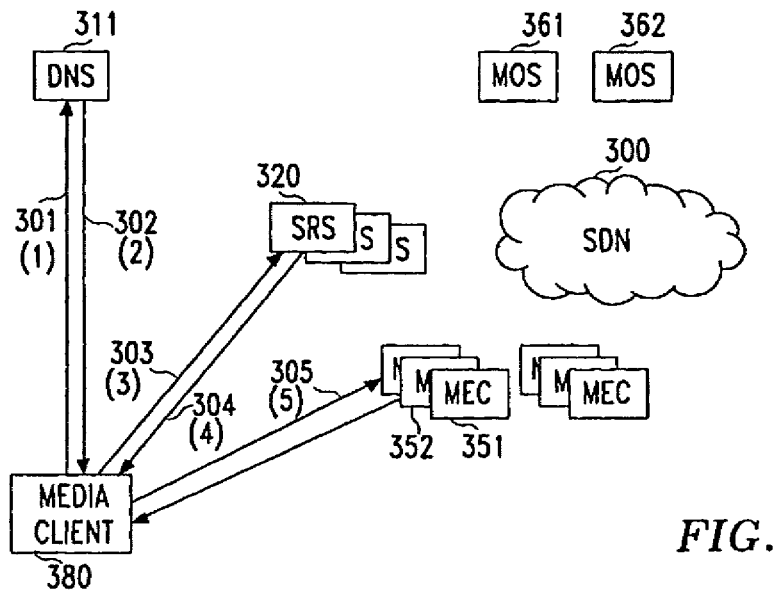
FIG. 3 is a conceptual representation of content redirection utilizing protocol redirect.
Figure 4:
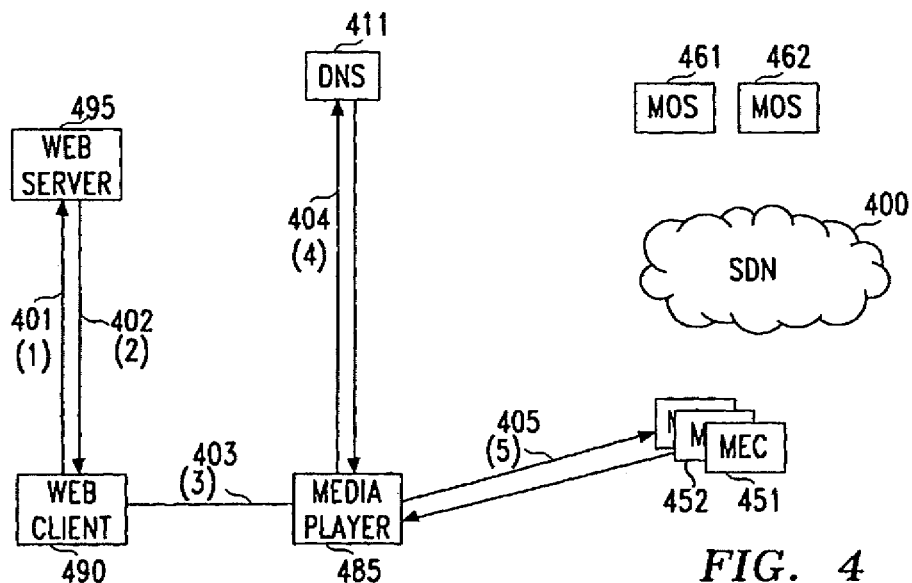
FIG. 4 is a conceptual representation of content redirection utilizing a dynamic helper file.

FIGS. 3 and 4 illustrate the two different methods of redirection. FIG. 3 is a conceptual representation of media redirection utilizing a protocol-level redirect, specifically in the context of the RTSP protocol. At step 301, a media client 380 has a URL, e.g. "rtsp://sr.target25.com/clip.rm". At step 302, the domain name system resolves the domain name "sr.target25.com" to any of the streaming redirect servers 320. At step 303, the media client 280 connects to the chosen streaming redirect server 320 with the URL "rtsp://sr.target25.com/clip.rm". At step 304, the streaming redirect server 320 decides on an "appropriate" content server for this request, for example redirecting the client to an edge server 351 with the URL "rtsp://mec10.att.net/att/clip.rm". The IP address of the edge server 351 can be utilized to prevent a DNS lookup. Then, at step 305, the media client 380 connects to the media edge cluster to stream the desired content. The media edge cluster 351 may already have the content in a cache or may obtain the content from a media origin server 361.

Protocol-level redirection does not rely on any standardized naming convention. A URL such as "rtsp://sr_rtsp.target25.com/balloon.rm" can map to "rtsp://real.atticds.speedera.net/real.atticds/balloon.rm" or to "rtsp://live-atticds.com/balloon.rm", for example with equal probability. Where a movie URL such as "rtsp://sr.att.com/bb/the_messanger" is requested, the URL could be mapped to "rtsp://mec5.icds.att.net/movies?id=1011" assuming that the content is already on the server cluster "mec5" or could be mapped to "rtsp://mec5.icdns.att.net/bb/the_messanger?url=rtsp://mos3.icds.att.net/movies?id=1011" where the movie is still on a central server "mos3" but it is desired to stream the movie from server cluster "mec5".

FIG. 4 is a conceptual representation of content redirection utilizing a dynamic helper file. At step 401, a user utilizing a web client 490 selects a media clip from a web page on a web server 495. The web server 495, at step 402, dynamically generates a helper file (e.g., a ".ram" or ".asx" file) with the appropriate URL, e.g., "mms://mec10.attnet/clip.asf". At step 403, the web client 490 invokes the media player 485, which contacts the domain name system at step 404 to resolves "mec10.att.net". Alternatively, the URL could be expressed with an IP address to avoid the DNS lookup. Then, at step 405, the media player 485 connects to a media edge cluster 451 to stream the desired content. The media edge cluster 451 may already have the content in a cache or may obtain the content from a media origin server 461.

This method of redirection again does not rely on any standardized naming conventions and can redirect between different protocols. For example, a URL of "http://www.target25.com/cgi-bin/getasx.asx?url=balloon.asx" can be mapped so that it returns an asx file with "href=http://httpmode.atticds.com/commercial/balloon.asf" or "href-mms://wm.atticds.speedera.net/wm.atticds/balloon.asf" with for example equal probability.

Note that it is not possible to do content aware redirection with other known redirection methods, in particular, DNS-based redirection. The reason is that DNS resolution resolves a DNS hostname to an IP address. The content part of a URL is therefore not taken into account. It is in principle possible to somehow "encode" the content into the host name and therefore overload the DNS system to be content-aware. There would however be a number of (known) problems with such a solution:

Load on the DNS system would dramatically increase as the system would be used in a way that it was not designed to be used.

By design the decision making would be more course grained because of DNS caching/time-to-live, no knowledge of the client requesting IP address and the fact that many clients might be hidden behind a single DNS query.

With DNS based redirection schemes it is also impossible to perform any mapping of the requested object name as it is not available within the DNS query.

Mapping Service

The decision as to where a media client should be redirected to typically involves many inputs. This might include load in the network, load at edge servers, policy, locality of client to CDN nodes, network characteristics between client and CDN nodes etc. The key criteria we are concerned with in this writeup however is the content that is being requested and where this currently resides in the CDN. Or more generally how that content should be obtained. For example, for live content, the decision might be to serve it from a particular edge server because of its locality, and the way for the edge server to obtain the content might be to join an application level streaming distribution tree.

One way in which the backend could be realized is to have all components (origin servers, edge servers, streaming redirectors, etc) take part in a content exchange/content discovery process. As illustrated by FIG. 2, origin and edge servers advertise the fact that they have a particular piece of content to a mapping service 230. When a redirector 220 receives a request for content it in turn consults the mapping service 230 to find out if and where the content is available and redirects the media client appropriately.

Thus, the primary function of the mapping service is to return the location of a piece of content, identified for example by a URN. In response to a query, the mapping service is responsible for returning a list of URLs specifying the servers on which the content may be found. A full query might look like this, in the context of a mapping service for television broadcast content:
<channel_name; brand; distributor; region; time; requestor_location>
The mapping service without limitation can be modeled as a huge, singletable database containing the following fields:
Time, Channel Name, Brand, Distributor, Region, Portal
In this naive approach, there is an entry in the database for every piece of content on the content network, regardless of whether that piece of content is unique or replicated. In other words, if the same piece of content is mirrored in twenty locations, there will be twenty distinct records in this database.

The mapping service, in accordance with a preferred embodiment of the invention, can accept two types of message: queries and updates. Queries ask the mapping service to locate a piece of content, identified by its URN. Updates allow portals to add content to the mapping service, delete it, or change certain attributes pertaining to a piece of content. There are a number of implementation approaches for the mapping service, which are listed below. As shown below, the most important issues to consider when designing a mapping service are the size of the database, the search time and the quantity of traffic.

1. Centralized Database.

Figure 5:
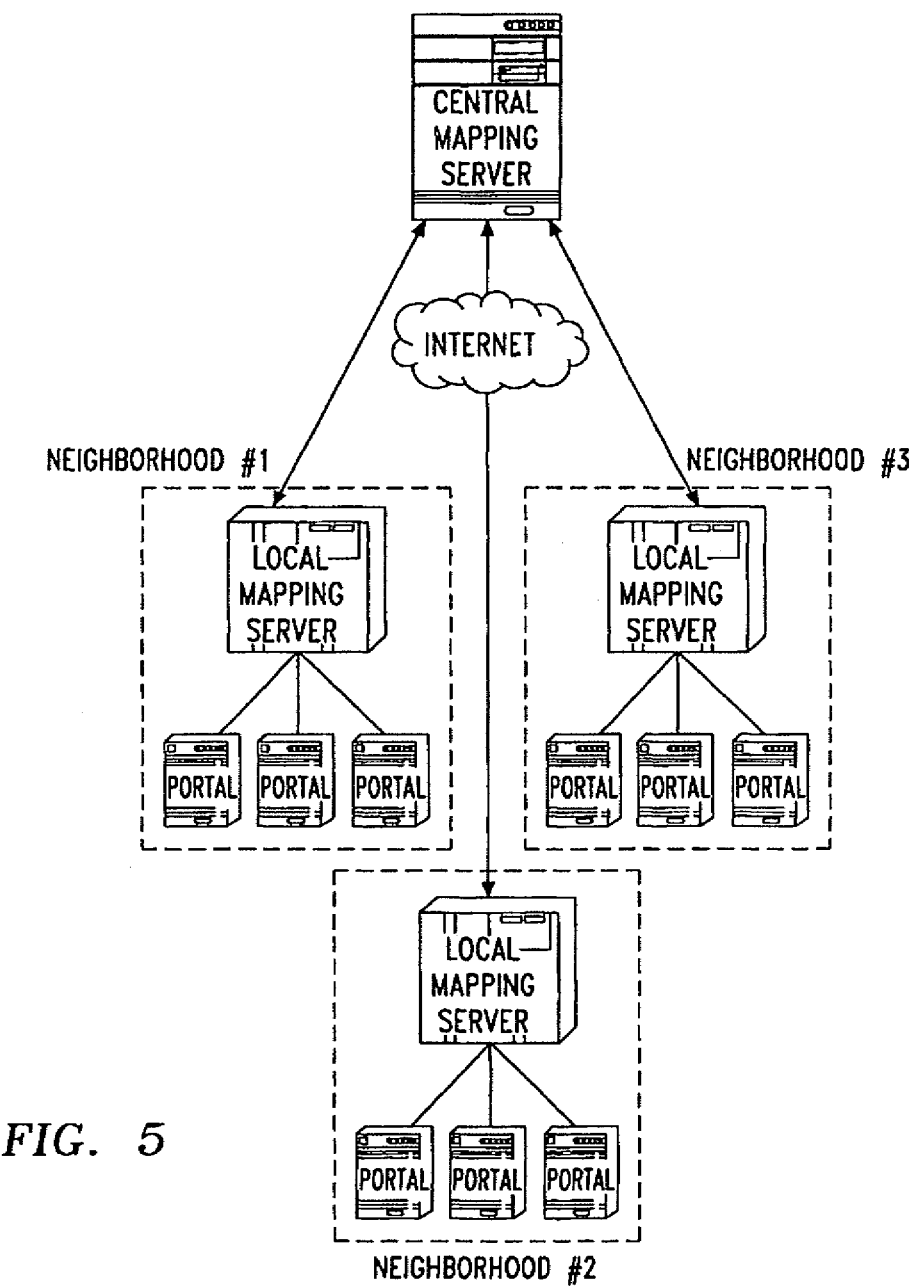
FIG. 5 through 9 illustrate different architectural options for content discovery, in accordance with an embodiment of the present invention.

In this solution, updates and queries are directed from from the portals to a single, centralized mapping server, as illustrated by FIG. 5. To speed local searches, a "Local Mapping Server" (LMS) can optionally be placed in each neighborhood as an intermediary. The Local Mapping Server serves the purpose of aggregating local content, as well as performing all communication with the Central Mapping Server (otherwise referred to herein as a "Global Mapping Server" (GMS)). Conceptually, this is the most straightforward implementation of the mapping service. This solution has the disadvantage of being relatively vulnerable to database failure; if the server were to go down or become unreachable, a large portion of the functionality would become unavailable for searching.

2. "Gnutella"Net/Multicast Distributed Database.

Figure 6:
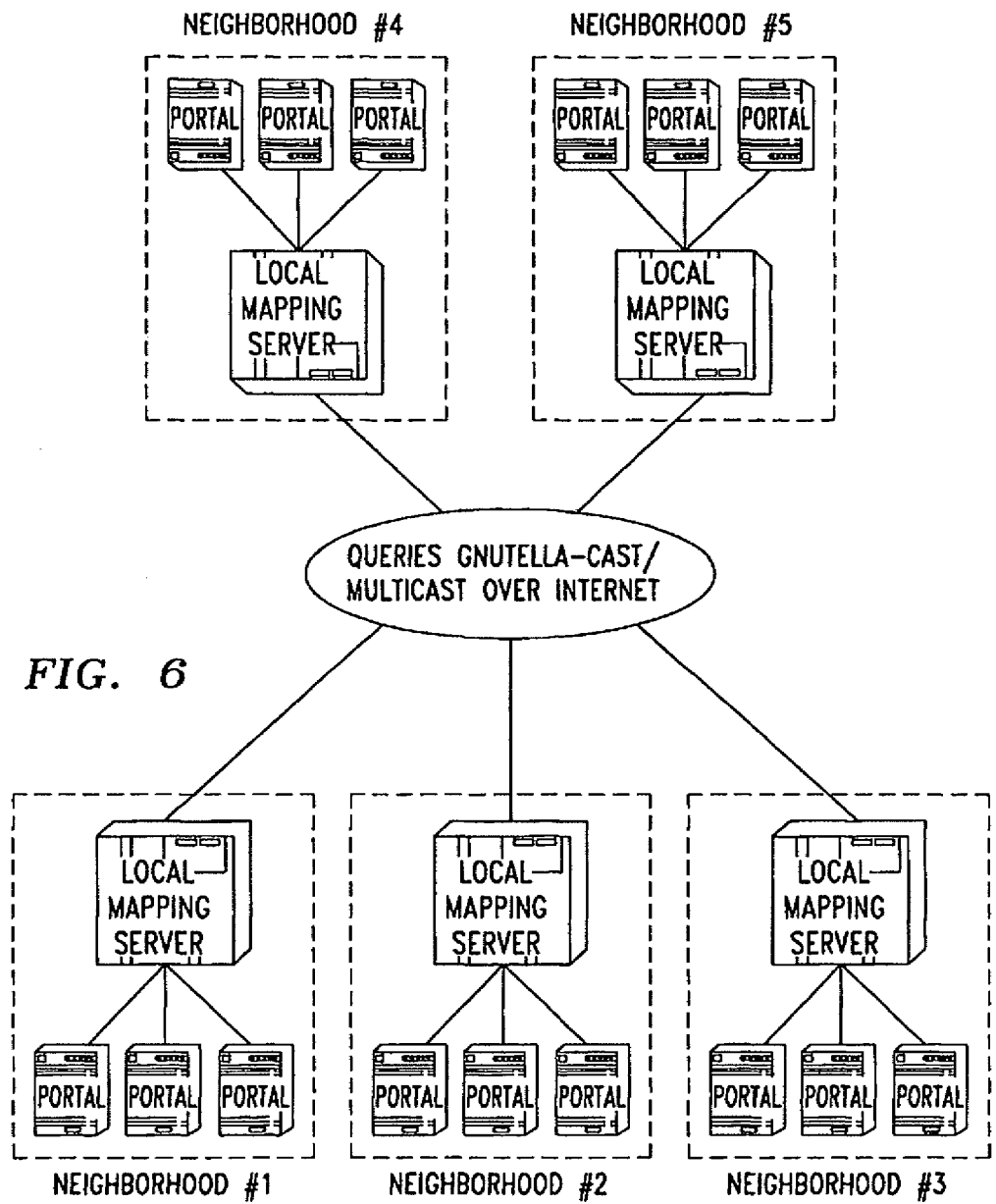

In this configuration, illustrated by FIG. 6, each portal (or group of portals, represented by a Local Mapping Server) maintains a database of its own stored content. There are no update messages transmitted between these nodes. When one node wishes to query the database, a query is broadcast to all nodes (through a network flooding scheme, or through multicast.) Any nodes containing the content then respond directly to the node initiating the query.

Unlike the singledatabase solution, this solution has the advantage of being relatively invulnerable to database failure; if one of the many nodes fails, only the content stored in that neighborhood becomes unavailable to the rest of the world. Database size is no longer an issue, as databases are maintained locally. Search times are lower for each local database, as these databases will be much smaller than a large amalgamated database (although the process of disseminating queries could potentially add a great deal to the response time.) Finally, if the queries are distributed along paths that resemble the network topology, it is likely that the earliest responses will come from those nodes "closest" to the querying node. The primary disadvantage to this solution is the large amount of query traffic, which would be broadcast to all clients; this flooding could potentially overwhelm the portals. Other problems include the lack of a "guarantee" of query failure—if no responses are received within a specified time period, querying nodes must simply assume that the search failed. By the same token, it is also possible that some searches will result in too many responses, temporarily overloading the querying node. Large amounts of broadcast query traffic would make this solution unworkable. As query messages are triggered by individual clients (viewers), it is possible that query traffic could be relatively large, possibly hundreds of thousands of queries per second. As this traffic is broadcast to all nodes, nodes might be unable to handle this enormous flood of queries. Although there might exist some mechanisms for reducing the quantity of query traffic (such as limiting the TTL of query requests) but these might not solve the problem.

3. Multiple Partitioning (Partitioned by Channel/Time/Distributor/etc.) Database.

Figure 7:
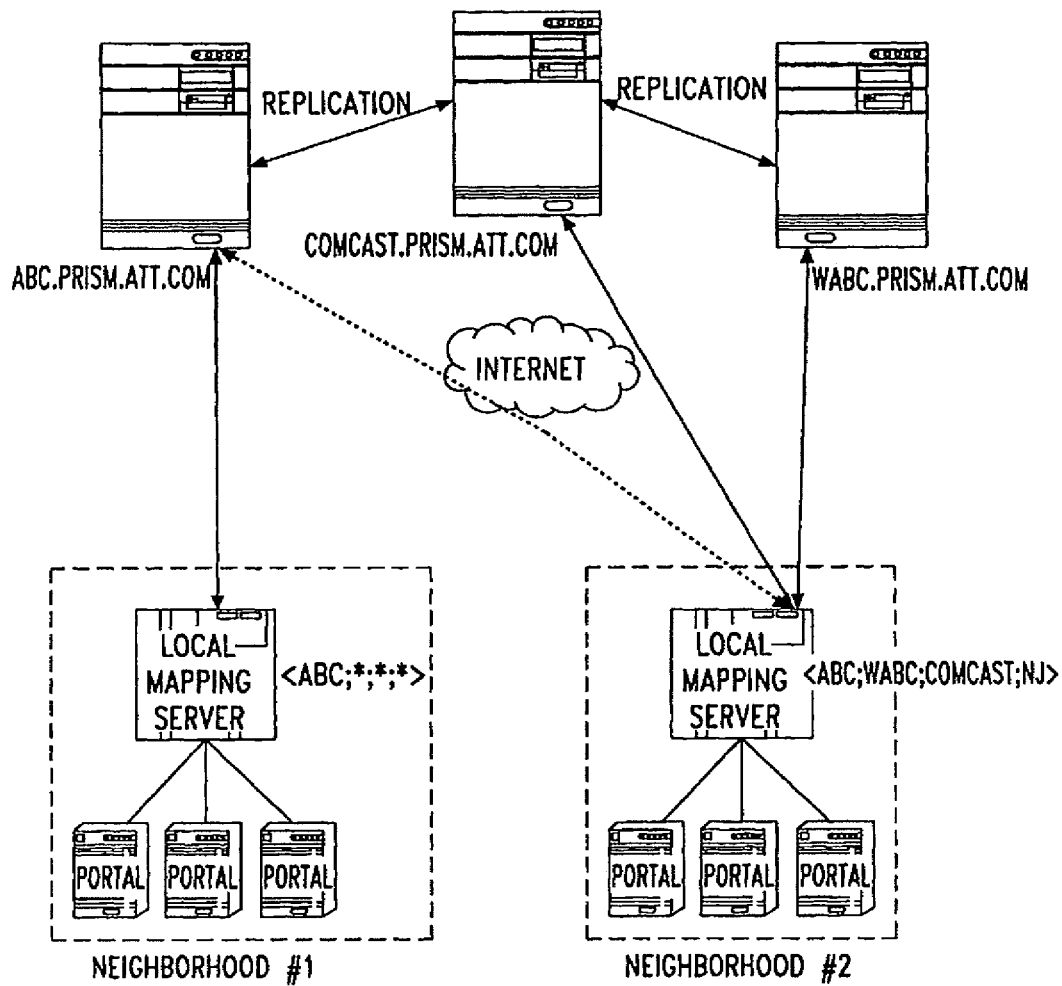

As illustrated by FIG. 7, this scheme improves on the scalability of the singledatabase approach, by partitioning the database into many smaller databases. Each of these subdatabases contains records associated with a given channel, time or distributor (for example.) When a portal wishes to perform a query, one of these subdatabases is chosen using information from the query URN. For instance, if the query URN contains the following information:
<ABC;WABC;comcast;new_jersey;10:30 PM>
Then the querying node might address the query to the subdatabase server responsible for records relating to the channel "ABC", to the server responsible for the affiliate "WABC", or to the server responsible for distributor "comcast" (etc.) The actual address of the servers might be calculated simply by generating a domain name (e.g. ABC.prism.att.com, WABC.prism.att.com, comcast.prism.att.com.).

The decision on which database to contact would depend on how the sub-databases are partitioned. If information is partitioned according to only one parameter (channel, for instance), then the querying node's decision would be straightforward. If the partitioning was based on multiple parameters—if, for instance, there existed both a "comcast" database and an "ABC" database—then the querying node would have to choose which database to contact. If data is to be partitioned based on multiple parameters—for example, if we do have both an "ABC" database and a "comcast" database—then the contents of the "comcast" database would need to substantially overlap the contents of the "ABC" database. This could lead to a great deal of database replication, and also requires that updates received at one database ("comcast" for instance) would need to be propagated to all other relevant databases ("ABC" and "WABC".)

This solution is potentially an improvement on earlier models with regards to scaling in that it does reduce the quantity of query traffic handled by individual databases. However, it does not necessarily reduce the traffic in a uniform way. Whether we partition the databases by channel name or any other parameter, there is no guarantee that query traffic will be evenly distributed across the resulting subdatabases. Since there will be such a high degree of database replication under this scheme anyway, it might almost make more sense if we simply replicated the full database many times (as illustrated below), and asked querying nodes to pick a server at random from a list. This way, we could at least guarantee a certain amount of uniformity.

4. Replicated Central Databases.

Figure 8:
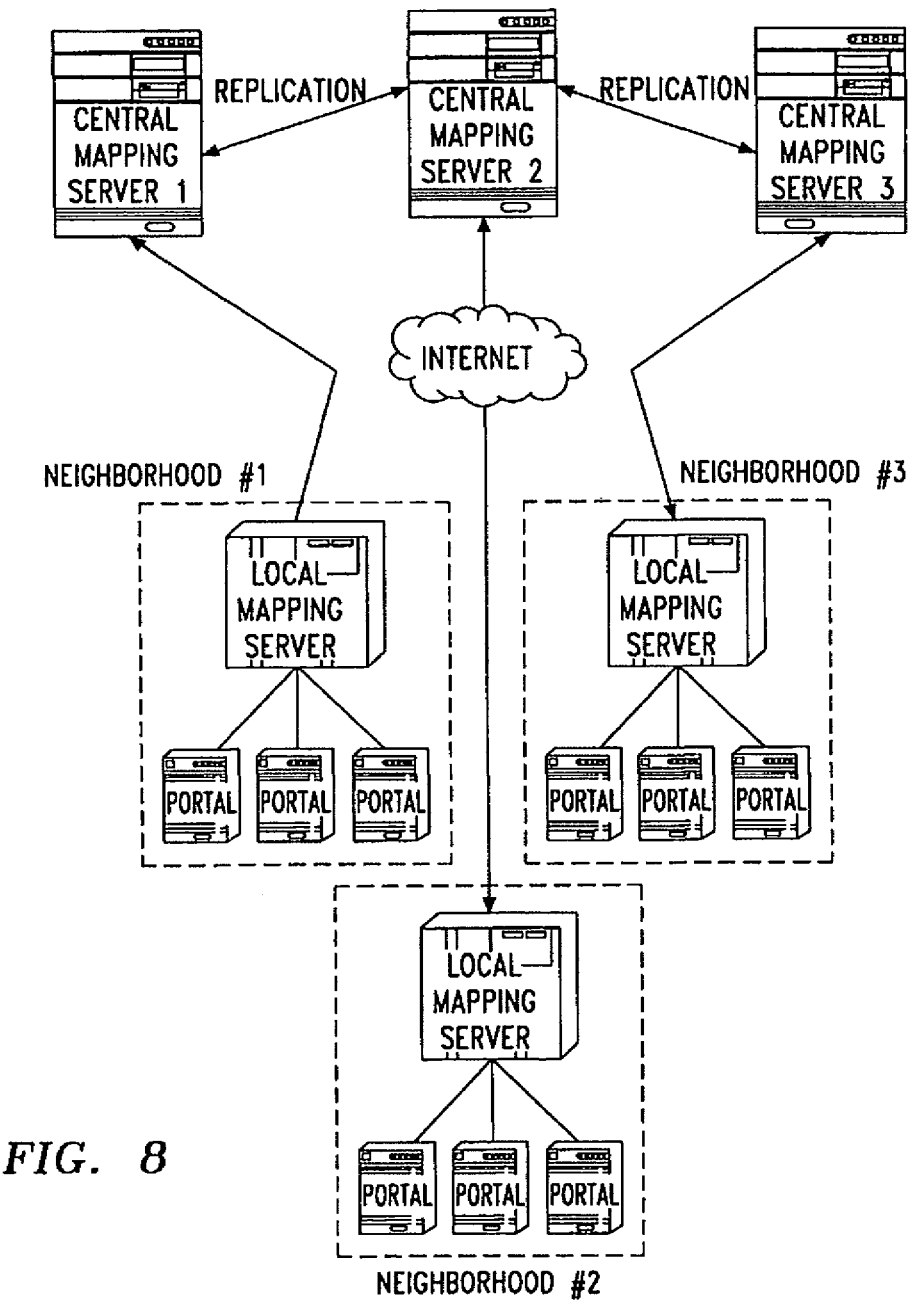

One of the most desirable features of a distributed database is the ability to redistribute dynamically, based on changes in load and the number of records. If it is assumed that one of the challenges will lie in regulating the number of queries, then one could use the simple mechanism mentioned in the previous paragraph: simply replicate the full database many times, and create a mechanism for distributing queries amongst the clones, as illustrated by FIG. 8. This approach would require a mechanism for propagating update traffic to all of the databases.

5. Replicated Local Databases ("Gnutella" Net approach).

Figure 9:
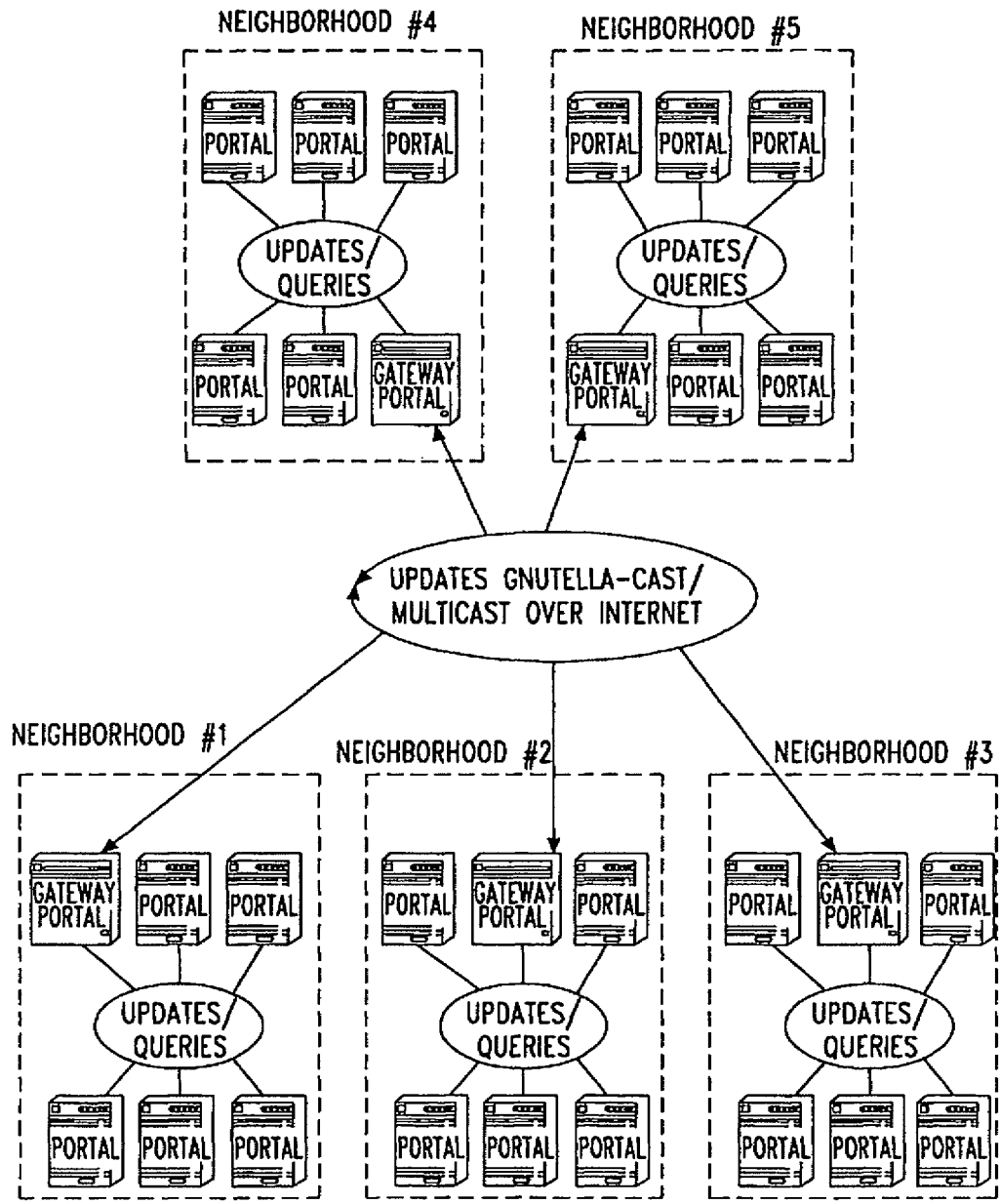

Another variation on the distribution of functionality would be for all portals within a neighborhood to constantly update each other about their stored content, as illustrated by FIG. 9. Each portal would therefore maintain a complete database of content available within its own neighborhood. To locate content that is not in the local neighborhood, this scheme designates a "gateway" portal within each neighborhood to take part in a similar distribution of available content with gateway portals from other neighborhoods. The gateway portal would be responsible for aggregating the reports of content available within its own neighborhood, transmitting that information to all other neighborhoods, and collecting reports back from other neighborhoods. In this scheme, the gateway portal represents the neighborhood at the interneighborhood level and individual portals within the neighborhood are not visible from the outside during this part of the content discovery process.

In this scheme a query would be handled as follows: Upon receiving or initiating a query, a portal would first check its local database, which would contain a full record of all content to be found within the neighborhood. If the query item were not found, the portal would then send a request to the neighborhood's gateway portal, which would then look the item up in its much larger "global" database.

This scheme could be repeated on larger scales, as well. Multiple domains can be linked in much the same way that different neighborhoods are linked in the above model. Again a designated node (this time from among the inter-neighborhood participants) would exchange information with peers in other domains. In this case, in addition to aggregating the reported content available within the domain, the designated portal would be responsible for implementing any policy filtering that might be required for exchange of content between domains. The advantage of this scheme is that the same basic scheme can be used at different levels in the hierarchy. Being completely distributed the scheme is potentially very robust against node failures. For the common case this scheme localize queries (the rate of which is user dependent) at the expense of having to distribute updates (the rate of which can be largely controlled by the system) throughout the neighborhood.

The major disadvantage to this scheme is that it might be too complicated for a local scheme, while an interdomain mechanism might be better served by a querybased solution. While potentially more robust this scheme is a lot more complicated than a simple centralized approach. A major worry in this configuration is that the individual databases might get out of sync with each other. This could occur if a number of update messages are destroyed. Once this occurred, it would be a very difficult situation to recover from, and could result in important content become inaccessible.

Another possibility would be to sort the database according to the one parameter that is unique in streaming content: time. If records are sorted by time, they can be broken up across several databases and queries directed properly based on the time requested. If query traffic reached uncomfortably high levels on any one server, that server could dynamically repartition, dumping some of its more popular records onto another server. With this approach, a mechanism is required for mapping requests to the correct server, even as records were moved.

Mapping Protocol

The following is a description of an advantageous mapping protocol, which the inventors have named the "URI mapping protocol" (UMP). The purpose of UMP is to map one URI to another, e.g. it can map a URN to a URL as part of the content discovery mechanism described above. The protocol could however be used in any generic URI mapping application. Similar to HTTP, RTSP and SIP, the UMP protocol is text based. It also attempts to reuse many of the header fields defined by these protocols.

The following provides a framework in which a more detailed protocol specification can be developed by one of ordinary skill in the art depending on the requirements and understanding of the problem space. In particular, in a distributed realization of the protocol, it will be necessary to add messages (and other support) to build the distribution network. There description does not specifically address any security or authentication issues, although known ideas from HTTP can clearly be reused.

This protocol can run over either a reliable transport protocol (e.g. TCP) or an unrealiable transport protocol (e.g. UDP). Following the example of RTSP and SIP a retransmission scheme is used only in the case where an unreliable transport is used. Similarly, since IP level fragmentation is undesirable, it should be required (like SIP) that UDP datagrams fit in one MTU if it is known or in 1500 bytes which is considered a reasonable default MTU size. Again following the SIP example, more compact representation of encodings can be used to reduce the per message length. For UMP over UDP, it is required that a response that would not fit in an MTU be truncated and sent with an appropriate error indication. Even though it is not the complete intended message, the truncated part of the message should be a properly formatted message. For example, a query that resulted in 20 mappings should return 15 complete mappings, assuming that is all that can fit in the MTU, rather than 15.5 mappings, with an error indication that all results could not be returned. Alternatively, a response to a UDP received query can be sent back over TCP, if allowed by the client.

The default operation for UMP is a "request-response" type interaction where every request message is acknowledged by the recipient by means of a response message.

Pipelining of requests are allowed and in this case the order of responses do not necessarily have to match the order or requests. Receipt of the response message by the requestor terminates this transaction (indicated by the transaction ID in the message pair). In the absence of other mechanisms, failure to receive a response-after a reasonable timeout can be used by UMP to trigger retransmission in the case where UMP runs over UDP. An alternative is to make use of some reliable transport layer between UMP and UDP. In UMP there are two exceptions to this default one-request-one-response form of interaction:

- In a distributed query operation, the first recipient of the query might be able to resolve it (i.e. produce a response message), but it will also pass the request on to its neighbors in the distribution network. These neighbors in turn might be capable of resolving the query (and sending it back towards the recipient) and will similarly pass on the request to their neighbors. In this mode of operation, the requestor (and nodes along the distribution network) should therefore be capable of processing multiple responses for each request. To accommodate UDP based implementations which might rely on the response for its retransmission scheme, a node should send back a response to the previous hop if it is forwarding the request to another node. This should be done even if the node in question was unable to resolve the query. If the node was able to resolve the query, the provisional response should contain these responses. Such a provisional response should indicate that it is not a final answer. The default case would be to use the provisional response for UDP but not for TCP, but the client is allowed to override the default.
- In a distributed update operation, e.g. by using native multicast, the requestor can indicate that it does not require an acknowledgement on its request. Since reliability can not be guaranteed in this mode of operation it is assumed that consistency will be provided by some other means, e.g. periodic refreshes and time-to-live values associated with mapping entries, or by making use of reliable multicast.

It is also advantageous to provide an OPTIONS message pair as well which will establish connectivity between communicating entities, telling the other end what type of node it is (e.g. client/server versus distributed operation transport protocols it can use, etc.).

The use of one URI per Query-Request and one URI mapping (e.g. URN to URL) per Update-Request simplifies the protocol. Use of multiple URI in Query-Request does not appear that compelling and it does complicate processing (e.g. what happens when a local mapping server can resolve some of the URIs locally but need to contact another entity to resolve the rest). For Update-Request the usefulness of multiple URIs seems more compelling. However, in this case pipelining the updates in one transport level message will work well enough albeit more inefficient. If this prove too limiting in practice, it is always possible to extend the protocol later on to accommodate multiple entries.

The following is a specification for the query messages, in accordance with a preferred the invention:

Query-Request:

R QUERY <query-URI (URN)> UMP/1.0
R Via: <list of IP addresses/hostnames, protocols and port numbers>
R TransactionID: <transaction id>

-continued

R TTL: <time to live value for request> # limit livetime and scope of requ
O RequestExpires: <UTC time after which the request should be ignored>
O Region-ID: <region/neighborhood of requestor>
O RegionTTL: <no of regions a distributed request may traverse> # limit sc
O MaxMappings: <max no mappings to be returned>
O Client: <IP address/hostname of client that generated request>
O User-Agent: <Info on client that generated request>
O Content-Length: <content length in bytes>
O Content-Type: <mime-type of content>
R v=0
R o=NULL
R s=NULL
n of:
R m=<media> <.> <fmt list> # acceptable media types Query-Response:

R UMP/1.0 Status-Code Reason-Phrase
R Via: <list of IP addresses/hostnames, protocols and port numbers>
R TransactionID: <transaction id>
O FromURI: <query-URI (URN)>
O ToURI: <mapped-to-URI (URL-1)>
O MappingTTL: <time in seconds (?) for which mapping is valid>
O Reply-from: <actual IP address/hostname,protocol and port no of respondi
O Content-Length: <content length in bytes>
O Content-Type: <mime-type of content>
R v=0
R o=NULL
R s=NULL
n of:
R a=FromURI=<query-URI (URN)>
R a=ToURI=<mapped-to-URI (URL-1)>
O a=Enclosing-Range=<UTC range>
O a=QFactor=<number between 0 and 1>
O a=Expires=<UTC timestamp>
O a=Policy-Description
O a=MappingTTL=<number of seconds that the mapping remains valid>
O m=<media> <.> <fmt list>

Note that "FromURI" has to be in response so that a querier know what the mapping is even associated with the "TransactionID" doesn't exist anymore. The "FromURI" has to be fully qu case of any wildcard queries the multiple (different) "FromURIs" might be in one response.

The following is a specification for the update messages, in accordance with a preferred embodiment of the invention:

Update-Request:

R UPDATE <update-URI (URN)> UMP/1.0
R Via: <list of IP addresses/hostnames, protocols and port numbers>
R TransactionID: <transaction id>
R TTL: <time to live value for request> # limit livetime and scope of requ
R UpdateMode: <update | remove>
O ToURI: <mapped-to-URI (URL-1)>
O NoAcknowledge: <yes | no>
O Region-ID: <region/neighborhood of updator>
O RegionTTL: <no of regions a distributed request may traverse>
O Content-Length: <content length in bytes>
O Content-Type: <mime-type of content>
R v=0
R o=NULL
R s=NULL
R a=FromURI=<update-URI (URN)>
R a=ToURI=<mapped-to-URI (URL-1)>
O a=Enclosing-Range=<UTC range>
O a=Expires=<UTC timestamp>
O a=Policy-Description
O m=<media> <.> <fmt list>

Update-Response:

R UMP/1.0 Status-Code Reason-Phrase
R Via: <list of IP addresses/hostnames, protocols and port numbers>
R TransactionID: <transaction id>

O Reply-from: <actual IP address/hostname, protocol and port no of respond

Note that the "update-URI" should be fully qualified with no range specification.

The "TransactionID" should be an opaque string of at least 8 octets. The "TransactionID" must be unique for every unique request. It can, without limitation, have a random component to it and/or can be globally unique when considered together with the sender's hostname.

It is also advantageous to add the following new status code:
New Status-Code Reason-Phrases
================================

230 Provisional Response # when request has been forwarded to other entiti # who might also respond The following are examples of the use of the above protocol for three scenarios: (1) where there is a centralized local mapping server (LMS) with a centralized global mapping server (GMS); (2) Distributed (replicated) LMS/distributed (replicated) GMS; and (3) Distributed (partitioned) LMS/distributed (partitioned) GMS.

Centralized LMS with centralized GMS.

Consider where there is an initial update from a portal configured to speak to a specific LMS. The following interaction occurs:

Request (from portal11 to lms234):

UPDATE stv:<abc;wabc;comcast;summit.nj> UMP/1.0
Via: ump/1.0/tcp portal11.att.net:747
TransactionID: 856789-1
TTL: 4
UpdateMode: update
ToURI: rtsp://portal11.att.net/abc.m2t
Response (lms234 to portal11):

UMP/1.0 200 OK
Via: ump/1.0/tcp portal11.att.net:747
TransactionID: 856789-1

The LMS will then send a similar update to the GMS (it might be immediate or it might wait for a while so as to aggregate updates from several portals).

Request (from lms234 to gms2):

UPDATE stv:<abc;wabc;comcast:summit.nj> UMP/1.0
Via: ump/1.0/tcp lms234.att.net:747
TransactionID: 06789543
TTL: 1
UpdateMode: update
ToURI: ump://lms234.att.net
Response (gms2 to lms234):

UMP/1.0 200 OK
Via: ump/1.0/tcp lms234.att.net:747
TransactionID: 06789543

Suppose a client request for stv:<abc;;;> is received by a portal in the same neigborhood as portal11. The following interchange occurs between the portal and the LMS:

Request (from portal12 to lms234):

QUERY stv:<abc;;;> UMP/1.0
Via: ump/1.0/tcp portal12.att.net:747
TransactionID: 12345678
TTL: 4
Response (from lms234 to portal12):

UMP/1.0 200 OK
Via: ump/1.0/tcp portal12.att.net:747
TransactionID: 12345678
FromURI: stv:<abc;wabc;comcast;summit.nj>
ToURI: rtsp://portal11.att.net/abc.m2t Suppose a client request for stv:<abc;;;> is received by a portal in a different neighborhood as portal11, and abc is not available from within that neighborhood. Then the following messages are exchanged:

Request (from portal31 to lms456):

QUERY stv:<abc;;;> UMP/1.0
Via: ump/1.0/tcp portal31.att.net:747
TransactionID: 123-456-0000
TTL: 4
Request (from lms456 to gms2):

QUERY stv:<abc;;;> UMP/1.0
Via: ump/1.0/tcp lms456.att.net:747
Via: ump/1.0/tcp portal31.att.net:747
TransactionID: 123-456-0000
TTL: 3
Response (from gms2 to lms456)

UMP/1.0 200 OK
Via: ump/1.0/tcp lms456.att.net:747
Via: ump/1.0/tcp portal31.att.net:747
TransactionID: 123-456-0000
FromURI: stv:<abc;wabc;comcast:summit.nj>
ToURI: ump://lms234.att.net
Response (from lms456 to portal31)

UMP/1.0 200 OK
Via: ump/1.0/tcp portal31.att.net:747
TransactionID: 123-456-0000
FromURI: stv:<abc;wabc;comcast;summit.nj>
ToURI: ump://lms234.att.net
Request (from portal31 to lms234)

QUERY stv:<abc;;;> UMP/1.0
Via: ump/1.0/tcp portal31.att.net:747
TransactionID: 123-456-0001
TTL: 4
Response (from lms234 to portal31)

UMP/1.0 200 OK
Via: ump/1.0/tcp portal31.att.net:747
TransactionID: 123-456-0001
FromURI: stv:<abc;wabc;comcast;summit.nj>
ToURI: rtsp://portal11.att.net/abc.m2t In this example, RTSP URLs are never visible outside the local neighborhood and a query therefore has to always go through a local mapping server to perform the final mapping.

2. Distributed (Replicated) LMS/Distributed (Replicated) GMS (Gnutella-Like Updates).

Assume that all portals in a neighborhood are part of a "gnutella"-like distribution network that is already established at this point. Similarly, assume that designated portals in each neighborhood is part of a higher level "gnutella"-like distribution network that is already established. The initial update is accomplished with the following messages:

Request (from portal11 to each of its neighbors in the network):

UPDATE stv:<abc;wabc;comcast;summit.nj> UMP/1.0
Via: ump/1.0/tcp portal11.att.net:747
TransactionID: 23232323
TTL: 4
UpdateMode: update
ToURI: rtsp://portal11.att.net/abc.m2t
Response (from each of neighbors to portal11):

UMP/1.0 200 OK
Via: ump/1.0/tcp portal11.att.net:747
TransactionID: 23232323

At this point the update is done as far as portal11 is concerned. Each of the neighbors that has received this message forwards it to each of their neighbours as follows (using portal13 as an example):

Request (from portal13 to each of its neighbors in the network):

UPDATE stv:<abc;wabc;comcast;summit.nj> UMP/1.0
Via: ump/1.0/tcp portal13.att.net:747
Via: ump/1.0/tcp portal11.att.net:747
TransactionID: 23232323
TTL: 3
UpdateMode: update
ToURI: rtsp://portal11.att.net/abc.m2t
Response (from each of neighbors to portal13):

UMP/1.0 200 OK
Via: ump/1.0/tcp portal13.att.net:747
Via: ump/1.0/tcp portal11.att.net:747
TransactionID: 23232323

This process continues until all portals in the neighborhood have received the update. The designated portal in this neighborhood will perform a similar update to all its neighbors in the higher level network, except that the "Location:" header will look like (assuming that portal15 is the designated portal):
Location: ump://portal15.att.net
This will allow the same hiding of the details of any particular neighborhood as in the previous example.

Any query received for stv:<abc;;;> in portal11's neighborhood will be resolved locally by the portal that receives the query since all portals have knowledge about the local neighborhood. A query for stv:<abc;;;> received in a different neighborhood will be treated as follows (again abc is not available from within that neighborhood). Assume portal31 received the query and that portal39 is the designated portal in this neighborhood (also portal31 has to know that portal39 is designated:

Request (from portal31 to portal39):

QUERY stv:<abc;;;> UMP/1.0
Via: ump/1.0/tcp portal31.att.net:747
TransactionID: 123-456-4555
TTL: 4
Response (from portal39 to portal31)

UMP/1.0 200 OK
Via: ump/1.0/tcp portal31.att.net:747
TransactionID: 123-456-4555
FromURI: stv:<abc;wabc;comcast;summit.nj>
ToURI: ump://portal15.att.net As before portal31 will then proceed to query portal15:

Request (from portal31 to portal15)

QUERY stv:<abc;;;> UMP/1.0
Via: ump/1.0/tcp portal31.att.net:747
TransactionID: 123-456-4556
TTL: 4
Response (from portal15 to portal31)

UMP/1.0 200 OK
Via: ump/1.0/tcp portal31.att.net:747
TransactionID: 123-456-4556
FromURI: stv:<abc;wabc;comcast;summit.nj>
ToURI: rtsp://portal11.att.net/abc.m2t What is interesting in this approach is how portals know at what level(s) of a hierarchy they should operate and how they find other portals at that level, plus how we define neighborhoods and how they get established. While this approach is more distributed than the previous one it still maintains (largely) the client/server style interaction of the previous approach.

3. Distributed (Partitioned) LMS/Distributed (Partitioned) CMS.

In this approach there are no updates. Instead queries are broadcast gnutella style through an overlay network. We assume that similar to the previous section a distribution network has already been established and that it is organized into neighborhoods. Designated nodes in each neighborhood form a higher level group by similarly having a distribution network amongst themselves. The "RegionTTL" field is used to determine the scope of a query.

As before, assume that portal11 carries stv:<abc;wabc;comcast;summit.nj>. A client request for stv:<abc;;;> is received by say portal13 in the same neighborhood as portal11.portal13 sends out a query to each of its neighbours as follows:

portal13 to each of its neighbors:

QUERY stv:<abc;;;> UMP/1.0
Via: ump/1.0/tcp portal13.att.net
TransactionID: abcdefgh
TTL: 4
RegionTTL: 1
each of portal13's neighbors responds with (assuming portal11 is not a direct neigbor of portal13):

UMP/1.0 230 Provisional Response
Via: ump/1.0/tcp portal13.att.net
TransactionID: abcdefgh
and sends the following message to each of their neighbors (using portal12 as example):

QUERY stv:<abc;;;> UMP/1.0
Via: ump/1.0/tcp portal12.att.net
Via: ump/1.0/tcp portal13.att.net
TransactionID: abcdefgh
TTL: 3
RegionTTL: 1
Assuming portal11 is a neighbor of portal12 it will repond to portal12 with:

UMP/1.0 200 OK
Via: ump/1.0/tcp portal12.att.net
Via: ump/1.0/tcp portal13.att.net
TransactionID: abcdefgh
FromURI: stv:<abc;wabc;comcast;summit.nj>

-continued

```
ToURI: rtsp://portal11.att.net/abc.m2t
portal12 will in turn relay the response to portal13 as:

UMP/1.0 200 OK
Via: ump/1.0/tcp portal13.att.net
TransactionID: abcdefgh
FromURI: stv:<abc;wabc;comcast;summit.nj>
ToURI: rtsp://portal11.att.net/abc.m2t
```

Negative acknowledgements are not relayed back to the original requestor. A designated node in this neighborhood would decrement the "RegionTTL" value and if it is greater than 1 will forward the request to all of its neighbors in the higher level network.

A query from a different neighborhood will be handled in similar fashion and assuming the scope of the query is higher than 1 will eventually via the higher level network end up in the neighborhood where portal11 resides, portal11 will respond in exactly the same way as above so that the requesting portal will end up with the URL for portal11. (In this case there is no LMS in the loop.)

Note that in the case where multiple responses are possible, an implementation implementation (at the initial requestor side) must be capable of receiving (and discarding) responses (long) after it might have cleaned up any state associated with the request. Other solutions to this problem involve the first upstream node maintaining state so the responses can be merged before being sent to the requestor and subsequent responses discarded.

It should be noted that it would be advantageous to include something in the protocol to indicate which protocol to use for interaction. It might be preferable to have a PortalID as additional information (e.g. this could simplify the index operation when an update is received). It may be preferable to ensure that redirects (e.g. from LMS to GMS back to LMS to GMS, etc.) will not occur and that when they do occur that the situation will not be disastrous. Also, the via fields will prevent loops from forming but will not prevent messages from being processed many times by the same node in the distributed cases. This might be addressed by requiring the distribution network to be a tree or by having nodes cache the transaction ids of recently seen messages (as in Gnutella). Finally, it should be noted that it is possible to do away with query response messages and only have updates, which can be either solicited or unsolicited.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been presented in the context of particular protocols such as RTSP and HTTP; however, the principles of the present invention could be extended to other protocols and content distribution architectures. Such an extension could be readily implemented by one of ordinary skill in the art given the above disclosure.

The invention claimed is:

1. A method for distributing content in a packet-switched network comprising:
  receiving, by a server, from a client of one of a plurality of content providers a request for content identified by a resource identifier, wherein the resource identifier is defined by a service provider of the packet-switched network to associate a plurality of different second resource identifiers with the resource identifier, wherein each of the plurality of different second resource identifiers comprises a unique name provided by a different one of the plurality of content providers to identify the content, wherein each of the plurality of content providers is a customer of the service provider of the packet-switched network;
  querying, by the server, a mapping service using the resource identifier for a list of servers in the packet-switched network that store the content, wherein the mapping service is implemented in accordance with a centralized mapping server;
  receiving, by the server, the list of servers; and
  redirecting, by the server, the client to one server of the list of servers using a second resource identifier of the plurality of different second resource identifiers, wherein each of the plurality of different second resource identifiers further comprises a uniform resource locator.

2. The method of claim 1, wherein the client is redirected using a protocol-based redirection.

3. The method of claim 1, wherein the resource identifier is a uniform resource name.

4. A method for distributing content in a packet-switched network, comprising:
  storing, by a server, in a database a list of servers in the packet-switched network that store content identified by a resource identifier, wherein the resource identifier is defined by a service provider of the packet-switched network to associate a plurality of different second resource identifiers with the resource identifier, wherein each of the plurality of different second resource identifiers comprises a unique name provided by a different one of a plurality of content providers to identify the content, wherein each of the plurality of content providers is a customer of the service provider of the packet-switched network;
  updating, by the server, the database as content stored on each of the list of servers changes;
  responding, by the server, to a query from a client of one of the plurality of content providers requesting the content identified by the resource identifier with the list of servers that store content, wherein the list of servers is used to redirect the client to one server of the list of servers using a second resource identifier of the plurality of different second resource identifiers, wherein each of the plurality of different second resource identifiers further comprises a uniform resource locator.

5. The method of claim 4 wherein the database is updated in response to update messages received from the servers.

6. An apparatus for distributing content in a packet-switched network comprising:
  a server for performing operations comprising:
    receiving from a client of one of a plurality of content providers a request for content identified by a resource identifier, wherein the resource identifier is defined by a service provider of the packet-switched network to associate a plurality of different second resource identifiers with the resource identifier, wherein each of the plurality of different second resource identifiers comprises a unique name provided by a different one of the plurality of content providers to identify the content, wherein each of the plurality of content providers is a customer of the service provider of the packet-switched network;

querying a mapping service using the resource identifier of the content for a list of servers in the packet-switched network that store the content, wherein the mapping service is implemented in accordance with a centralized mapping server;

receiving the list of servers; and redirecting the client to one server of the list of servers using a second resource identifier of the plurality of different second resource identifiers, wherein each of the plurality of different second resource identifiers further comprises a uniform resource locator.

7. The apparatus of claim 6, wherein the operations further comprise redirecting the client using a protocol-based redirection.

8. The apparatus of claim 6, wherein the operations further comprise redirecting the client using a helper file.

9. The apparatus of claim 6, wherein the resource identifier is a uniform resource name.

* * * * *